(12) United States Patent
Huang

(10) Patent No.: US 9,410,722 B2
(45) Date of Patent: Aug. 9, 2016

(54) WATER HEATER PANEL

(71) Applicant: Lai Huang, Alhambra, CA (US)

(72) Inventor: Lai Huang, Alhambra, CA (US)

( * ) Notice: Subject to any disclaimer, the term of this patent is extended or adjusted under 35 U.S.C. 154(b) by 460 days.

(21) Appl. No.: 14/153,851

(22) Filed: Jan. 13, 2014

(65) Prior Publication Data

US 2015/0198355 A1    Jul. 16, 2015

(51) Int. Cl.
*F24J 2/00* (2014.01)
*F24J 2/05* (2006.01)

(52) U.S. Cl.
CPC ... *F24J 2/05* (2013.01); *Y02E 10/44* (2013.01)

(58) Field of Classification Search
CPC ................... F24J 2/05; F24J 2/242
USPC ................ 126/676, 646, 708, 652
See application file for complete search history.

(56) References Cited

U.S. PATENT DOCUMENTS

| | | | | |
|---|---|---|---|---|
| 4,084,576 A * | 4/1978 | Pei | ............ | F24J 2/045 126/657 |
| 4,084,580 A * | 4/1978 | Roark | ............ | F24J 2/265 126/645 |
| 4,111,187 A * | 9/1978 | Wiegand | ............ | F24J 2/045 126/634 |
| 4,294,232 A * | 10/1981 | Boy-Marcotte | ............ | F24J 2/05 126/649 |
| 4,307,711 A * | 12/1981 | Doundoulakis | ............ | F24J 2/06 126/600 |
| 4,333,448 A * | 6/1982 | Johnson | ............ | F24J 2/05 126/569 |
| 4,355,628 A * | 10/1982 | Watts | ............ | F21S 8/088 126/570 |
| 4,546,758 A * | 10/1985 | Ebernard | ............ | F24J 2/07 126/635 |
| 4,601,282 A * | 7/1986 | Mountain | ............ | F24J 242/085 126/573 |
| 4,719,902 A * | 1/1988 | Klier | ............ | E04H 4/06 126/567 |
| 9,051,923 B2 * | 6/2015 | Kuo | ............ | F03G 6/005 |
| 2006/0207590 A1 * | 9/2006 | Levin | ............ | F24J 2/14 126/651 |
| 2009/0101207 A1 * | 4/2009 | Milbourne | ............ | H01L 31/18 136/259 |
| 2010/0206296 A1 * | 8/2010 | Matalon | ............ | F24J 2/0483 126/605 |
| 2011/0011449 A1 * | 1/2011 | Morgan | ............ | H01L 29/70 136/255 |
| 2011/0192440 A1 * | 8/2011 | Wu | ............ | F24J 2/14 136/244 |
| 2011/0290235 A1 * | 12/2011 | NewDelman | ............ | F24J 2/0007 126/643 |
| 2012/0234313 A1 * | 9/2012 | Rostami | ............ | F24J 2/05 126/652 |
| 2013/0074830 A1 * | 3/2013 | Mulcey | ............ | F24J 2/14 126/657 |
| 2013/0081396 A1 * | 4/2013 | Kuo | ............ | F24J 2/50 60/641.8 |
| 2013/0306130 A1 * | 11/2013 | Reichstetter | ............ | H01L 31/0525 136/246 |
| 2014/0023803 A1 * | 1/2014 | Kawanami | ............ | C03C 3/072 428/34 |
| 2015/0267939 A1 * | 9/2015 | Park | ............ | F24J 2/05 126/652 |

* cited by examiner

*Primary Examiner* — Avinash Savani
(74) *Attorney, Agent, or Firm* — Clement Cheng

(57) ABSTRACT

A solar energy collector comprises a solid body having a substantially planar solar energy absorbing collecting surface. The solid body has a first thickness at a center portion tapering to a second thickness at each of a pair opposing edge portions defining a width of the body. A bore extends completely through the body along its length and is aligned along an axis at the center portion. A window transparent at most solar radiation in the visible spectrum and near UV to infrared-red solar energy wavelengths is disposed at a distance from the collecting surface, the window sealed around a periphery of the collecting surface to define a sealed air gap or nitrogen gas filled gap between the collecting surface and the bottom surface of the window. The solar energy collector is a major component of a solar water heating system.

10 Claims, 18 Drawing Sheets

ROOF PLAN

DETAIL 1

SOLAR ENERGY COLLECTOR CROSS SECTION

DETAIL 2

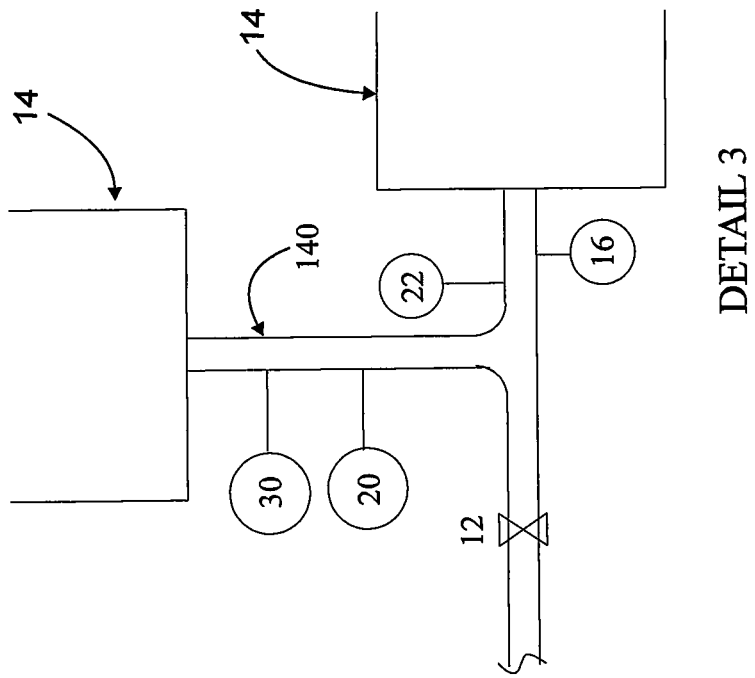
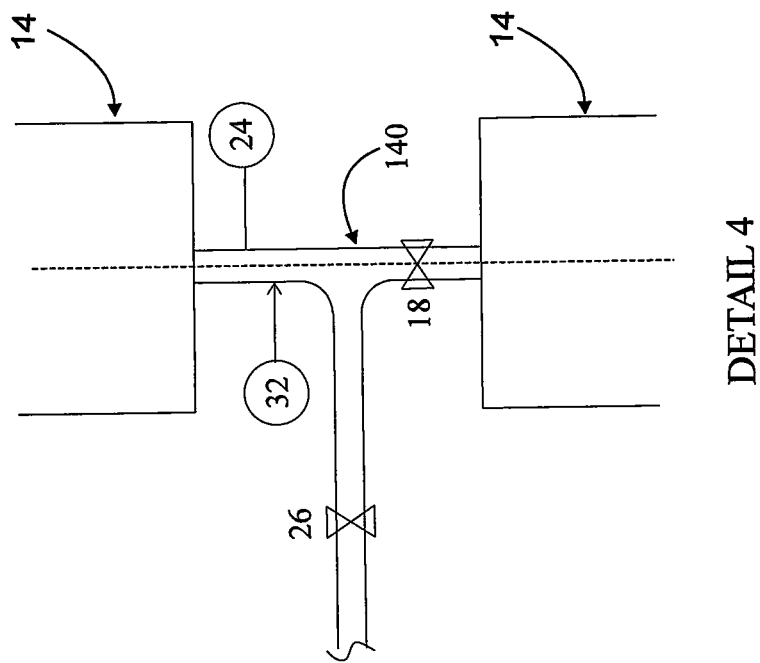
Fig. 4

SOLAR ENERGY COLLECTOR SUPPORT STRUCTURE - ALUMINUM

HOT WATER STORAGE TANK

SELECTER

LOGIC DIAGRAM

OPERATION LOGIC DIAGRAM

FLOW DIAGRAM

SELECTER SWITCH

TIMER

3 PHASE, 208/120V POWER PANEL

SELECTER SWITCH

VALVES
SOLAR SYSTEM

WATER HEATER PANEL

BACKGROUND

1. Field of the Invention

The present invention relates to the design of a solar water heating system. More particularly, the present invention relates to a design of a complete solar water heating system including the solar energy collector and associated automatic control system in response to the rapid changing sunny-cloudy-raining weather changes to achieve the efficient usage of solar energy, and provide low cost and reliable heated water for daily use

2. The Prior Art

Solar power is a huge blessing from the mother nature to humankind. On average, solar energy falls on earth is about 2 calories per square centimeter per minute. This is equivalent to burning 100 million tons of good coal per minute. The effective use of this energy would help preserve the fossil fuel resources. It would lead to saving of fuel cost otherwise would be required for heating water or generating electric power. It would also reduce emission of polluting gas such as $CO_2$, reducing the greenhouse effect on earth.

The coal being used today came from the trees existed several hundred million years ago using the solar energy available then to help tree grow. So, using the coal today is actually using the solar energy stored in the trees existed 100 millions years ago.

Traditionally the fossil fuel such as natural gas, coal, wood, and electricity are used for heating water to produce hot water. But the reserves of fossil fuel are limited. The more fossil fuel are burned, the more fuel reserve will go down and more pollution gas $CO_2$ will be generated. With an estimation of only 100 more years of world oil supply, 80 more years of available nuclear fuel, 100 years of natural gas reserve and 300 more years of coal supply are left, the potential of the solar energy available should be actively pursued and utilized. One way to help achieve this object is to build solar water heating system for general household. It would reduce the consumption of available fossil fuels and the electricity used for heating water. The saved fuel and the electricity could be used for other good purposes. The mining activities for fossil fuel could be reduced. It would save cost of mining and preserve natural resources. It would also reduce emission of additional $CO_2$, and mitigate the life and environment threatening problem of global warming. The solar energy is abundant and free, it should be actively utilized.

The development of solar energy usage technology has been in progress for many years. Many solar power projects have been planned and/or built with large amount of investment. However, the results have been less than satisfactory. The photovoltaic technology using silicon plate has been proven to be expensive. The manufacturing process for silicon plate is delicate and therefore expensive. Then, under strong bombardment of ultra-violet (UV) radiation, the high cost silicon solar panels deteriorate before the investment capital could be recovered. Its effective system life is often not as predicted. The returns on invested capital are mostly lower than the original investment. It is not cost effective. Many solar power plants have been abandoned during construction, or after short term operation. Generally, the bankers are hesitant to commit capital to solar power plant project because the capital returns are less than anticipated. Presently many solar silicon panel manufacturers worldwide failed financially. This is a disadvantage for solar energy industry. The vast amount of solar energy has not been continuously utilized day after day. This invention is devised to offer a way to harness the solar energy effectively, practically and at low cost.

The emphasized objects in the proposed equipment and system are: effective use of solar energy, low cost, reliable, low maintenance, long life, and easy to use.

The proposed solar energy collector is using the same idea as given in the patent application by the same author, title as "A Design of Dual Sources Solar Thermal Power Plant". That is made from the aluminum body covered by a sheet of glass, and encased by effective insulation material. The glass is to pass the sun light and prevent massive heat loss back to atmosphere. A flat bottom of aluminum is painted black or by anodized aluminum coating. The water flow is through a hole near bottom of the aluminum body while absorbing heat from the body.

The weather conditions in each geological area are generally different. In some areas, there are always sunshine, while other areas would have weather condition changing from sunshine, to cloudy, and to raining. So the proposed equipment and system should be applicable to suit all different weather conditions. The solar energy collection is only possible during sunshine. Therefore a quick response automatic control system is required to control the system to follow the weather changes and adjust the system to best suit the latest conditions, producing the best results. Another important purpose of the automatic control feature is to minimize the human-machine interfaces. This would save many human hand-on control, minimize chance of human action errors. The automatic control system will includes a centralized control panel, a timer, a photo sensor to check if it is sunshine, small water pumps, three water temperature sensors, three water level switches, water flow sensor, air valve, auxiliary relays and water flow control valves. These control equipment and sensors will respond to changing weather conditions, and automatically perform the water heating process, or stop the system solar collecting process when it is raining or a cloudy day.

An insulated hot water tank is provided to store the solar heated water for household use. The tank will be provided with two high water level switches and a low water level switch. Two high level switches would be set at high-high positions. When the hot water level is at high-high, the high level signal will be sent out, stop the system process since the hot water tank is full, no more hot water is needed. The low water level switch will be used to stop the pump-out operation when water tank is almost empty.

The households still need hot water for bath or other use during raining or cloudy day where solar power is not available, therefore a standby gas (or propane) water heater should be provided. A selecter switch will be provided to select operation mode between solar power and gas power. An off position is also provided to shutdown the whole system, for cases like the vacation time and whole family is absent.

The equipment in the system are solid, simple and reliable, the system is expected to be practical.

No fancy equipment is required. The system cost is low and affordable. It has a capability of long term operation. It is necessary that the system cost must be reasonable low and the system is durable for long term operation. The economy of the system and the long term effective operation are crucial to make the system practical.

BRIEF DESCRIPTION

A solar energy collector comprises a solid body having a substantially flat planar solar energy absorbing collecting surface. The solid body has a first thickness at a center portion tapering to a second thickness at each of a pair opposing edge portions defining a width of the body. A bore extends completely through the body along its length and is aligned along an axis at the center portion. A thin window transparent at selected solar energy wavelengths (for example, from ultra violet solar radiation to infrared-red radiation) is disposed at a distance from the collecting surface, the window sealed around a periphery of the collecting surface to define a sealed air gap between the collecting surface and the bottom surface of the window. The air gap will prevent the large amount of heat loss to atmosphere from the collecting surface up to the bottom face of the window. The window glass thickness is to be 1/16 of an inch or less for maximum solar radiation transpierce effect.

In one exemplary embodiment, the first thickness at the center portion may be about 1.5 to 2 inches, the second thickness at the opposing edges may be about 0.25 inch, and the first thickness tapers to the second thickness substantially linearly. The bore hole may have a diameter of about 1 inch. The thicker central portion of the body is to provide higher heat sink and to provide sufficient space for the bore to be completely inside the body. Another effect is to provide sufficient mechanical strength to bear the pressure from high temperature water or liquid. The thin both edges are for the purpose of lower cost by saving quantity of material.

The planar solar energy absorbing collecting surface is black in color, as the black color is the most efficient for absorbing solar energy among all colors in the visible light spectrum, and solar radiation with wavelengths between ultra-violet to infrared-red. The body may be formed using different techniques. One such technique is casting and another is extrusion. The body may be formed from a metal, such as aluminum, as the aluminum is highly heat conductive and low cost among other metal. In embodiments where the body is formed from aluminum, the planar solar energy absorbing collecting surface may be black anodized or may be painted black. The black anodized aluminum coating on the aluminum body offers the most efficient solar energy absorbing capability. The window may be formed from glass transparent at all energy carrying solar radiations with wavelengths between UV wavelength and infrared-red wavelength.

Solar energy collectors are lined up in many linear columns.

Water pass through the bore is used for heat transfer material in the solar collector and is hence heated.

When the water is heated by solar energy in this system, it will achieve at least to the water boiling point, (212° F. or 100° C.).

The weather conditions change at all time and at different areas. Some time it is sunshine yet other time would be cloudy or even raining. Solar energy can be collected and utilized only when the sunshine is present. Therefore an effective automatic control system would be required to respond to the different weather condition, effectively utilize solar energy. An automatic control system which includes several devices, equipment and instrument is included for this system to make the system operation highly automatic, save the human work, minimize the human-machine interfaces, reduce the chances of human errors. An insulated hot water storage tank of 60 gallons (40 to 100 gallons range, or even larger), made of metals such as aluminum or galvanized steel, a cold water reserve tank, and a standby gas water heater are provided as integral part of the system. Solenoid or other type valves, photo-sensor, temperature sensors, level switches, flow sensors, air valve, piping, and pumps are included in the system facilities. Auxiliary relays are used to relay the equipment function.

A solar energy collector comprises a solid body having a substantially planar solar energy absorbing collecting surface. The solid body has a first thickness at a center portion tapering to a second thickness at each of a pair opposing edge portions defining a width of the body. A bore extends completely through the body along its length and is aligned along an axis at the center portion. A window transparent at most solar radiation in the visible spectrum and near UV to infrared-red solar energy wavelengths is disposed at a distance from the collecting surface, the window sealed around a periphery of the collecting surface to define a sealed air gap or nitrogen gas filled gap between the collecting surface and the bottom surface of the window. The solar energy collector is a major component of a solar water heating system. Other major equipment include the cold and hot water tanks, a standby gas or propane water heater, an automatic control system, a small power distribution panel, a control panel, insulated piping, water pumps, air valve, water valve, temperature sensors, flow sensor, auxiliary relays, level switches, timer, photo cell, selector switch and push buttons.

The solar water heating system has a solar energy collector configured to absorb solar energy to heat cold water to make hot water for building use. The solar energy collector has a solid body having a length. The solar energy collector has a flat planar solar energy absorbing collecting surface. The solid body has a first thickness at a center portion tapering to a second thickness at each of a pair opposing edge portions defining a width of the body. The second thickness is less than the first thickness. The flat planar solar energy absorbing collecting surface is black in color either by painting or by anodized aluminum coating. A bore extends completely through the body inside the body. The bore extends along the length and wherein the bore is aligned along an axis at the center portion. A glass window has at least partial transparency at solar energy wavelengths. The glass window is disposed at a distance from the flat planar solar energy absorbing collecting surface. The glass window is sealed around a periphery of the flat planar solar energy absorbing collecting surface to define a sealed space gap between the collecting surface and the bottom surface of the window. The sealed space gap is filled with a gas to resist atmosphere pressure. The window resists mass heat dissipation from the body to the atmosphere. A water flow handler and an automatic control system including, an automatic water flow control system to control a process of heating cold water to hot water. The automatic control system further includes a power distribution panel, a control panel, a timer, a photo cell, a temperature sensor, a flow sensor, a selector switch, a push button, an auxiliary relay, an air valve, a water valve, a level switch, a pump and piping. The solar water heating system may have a sealed space gap filled with nitrogen gas to resist atmosphere pressure. The solar energy collector body can be formed as an extrusion or casting. The solar energy collector body is preferably formed from a metal aluminum. The window can be formed from glass transparent for UV wavelengths. The thickness of the window glass is a maximum of $1/16^{th}$ of an inch, but can be thinner to maximize the passage of sunlight. The first thickness at the center portion is preferably between about 1.5 inches and 2 inches. The second thickness at the opposing edges is preferably equal to or less than 0.25 inches. The first thickness preferably tapers to the second thickness linearly. The space gap between the glass and the bottom heat collector aluminum plate can be filled with air or nitrogen and the space gap is equal to or less than 0.25 inches.

BRIEF DESCRIPTION OF THE DRAWINGS AND FIGURES

FIG. 1 shows the solar water heating system plan on a building roof. The roof shown is a flat plan. The system could also be installed on a flat yard. With proper support structure, the equipment can also be installed on slope roof.

FIG. 4 shows connection details of the solar energy collector to interim piping, Detail 3 and Detail 4.

Figure 10B:
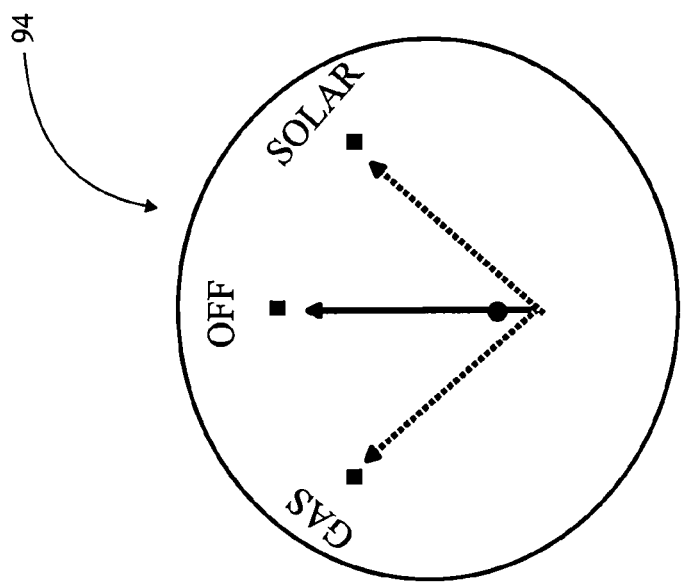
Figure 10A:
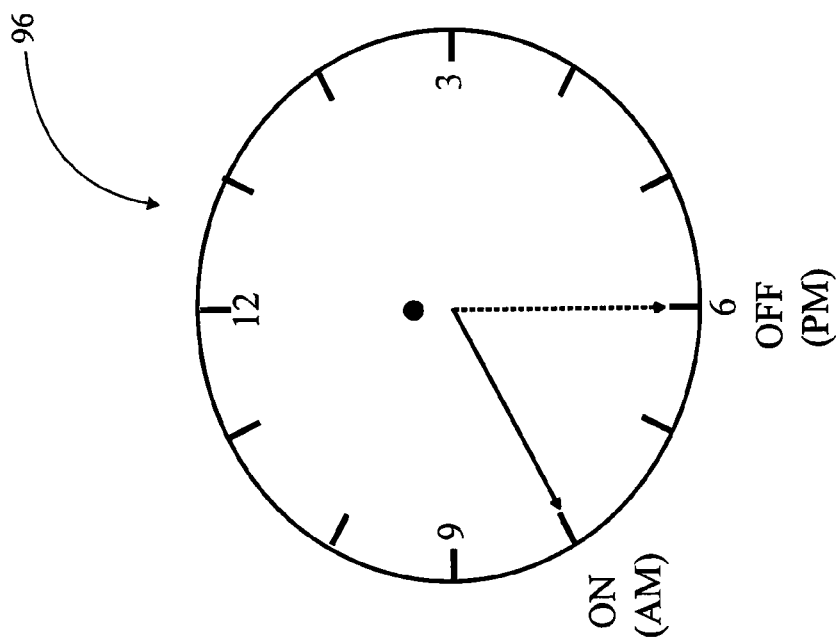

FIG. 10A shows the timer setting of on-off for system operation. The solar energy collector can function only at day time. The time can be set depending on geological location as needed. FIG. 10B shows the selector switch for operation modes such as solar, gas heated or off. The solar operation is set for sunny days, with the gas operation set for cloudy and raining days, and set at off when hot water is not needed.

Figure 11:
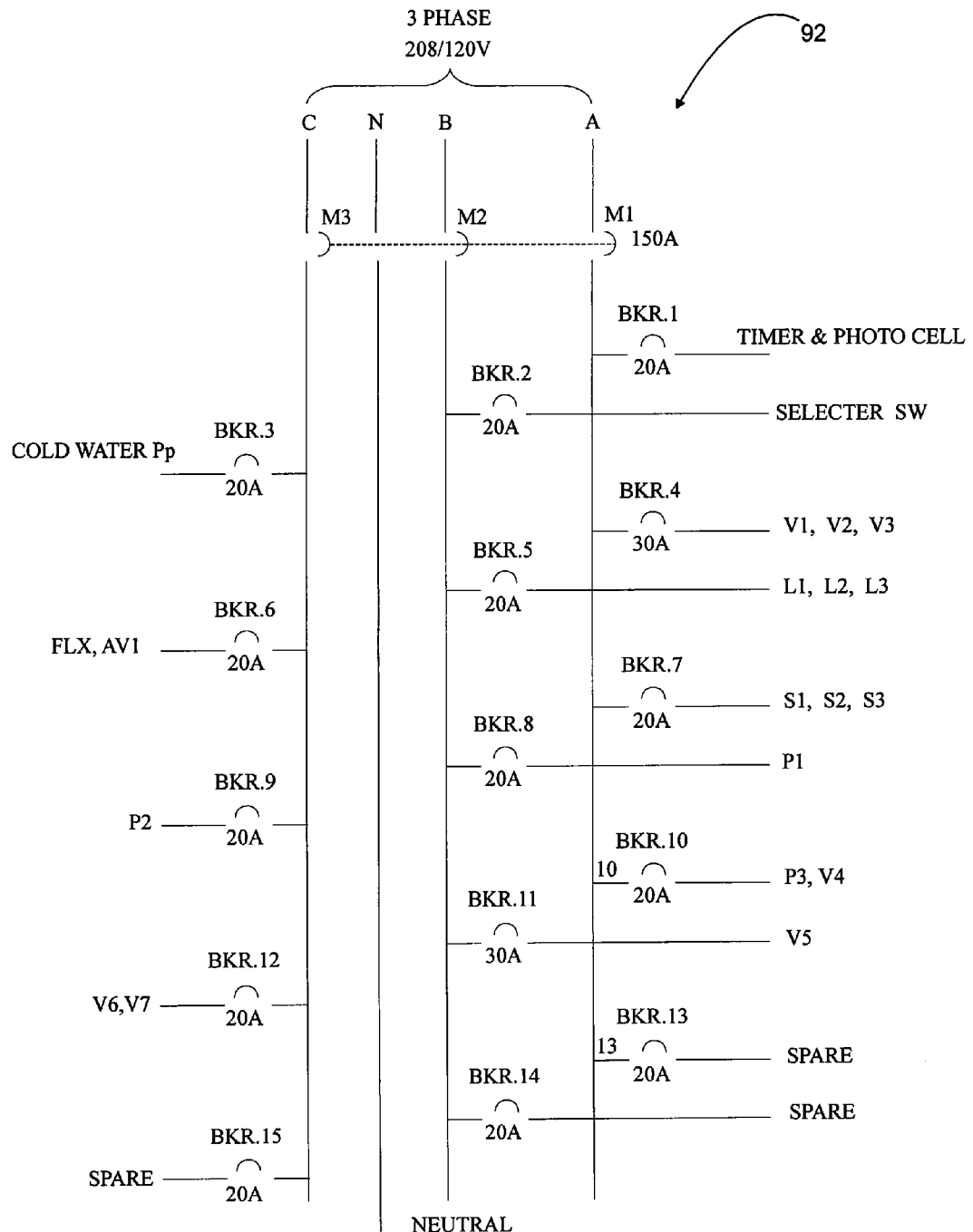

FIG. 11 shows the control power distribution panel, the circuit breaker arrangement diagram.

Figure 12:
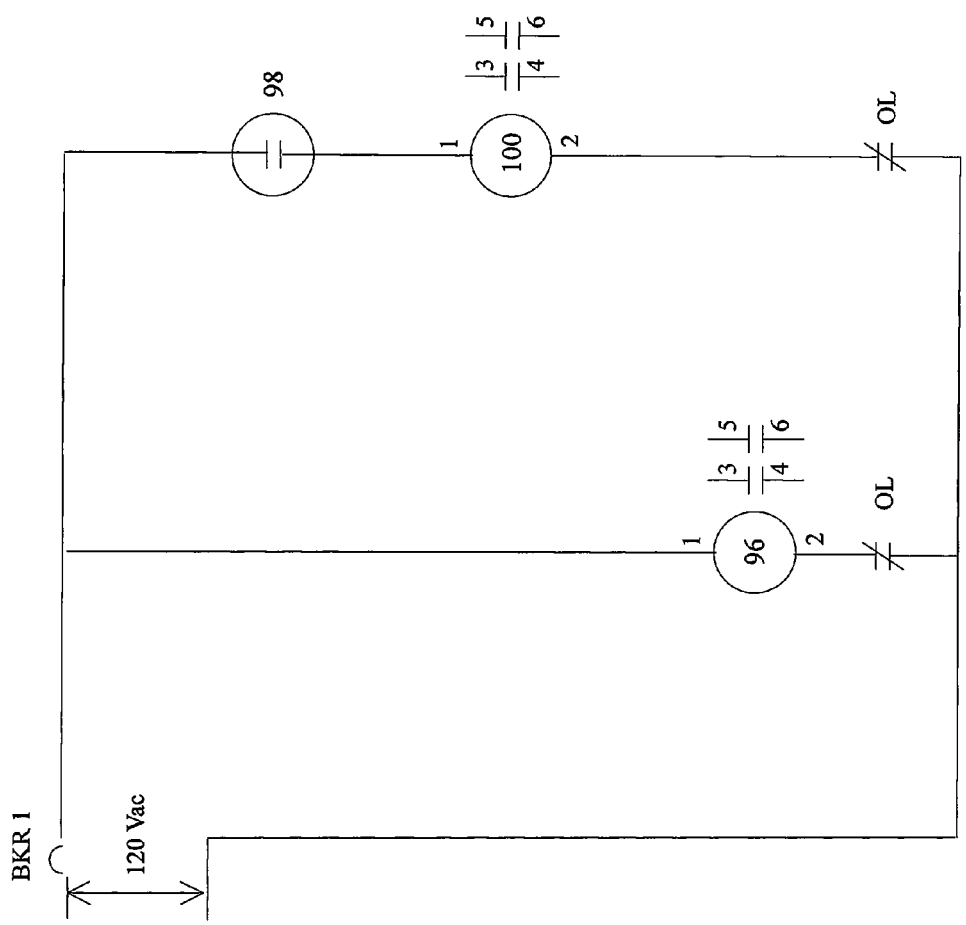

FIG. 12 shows the timer and photo cell with auxiliary relay control schematic diagram.

Figure 13:
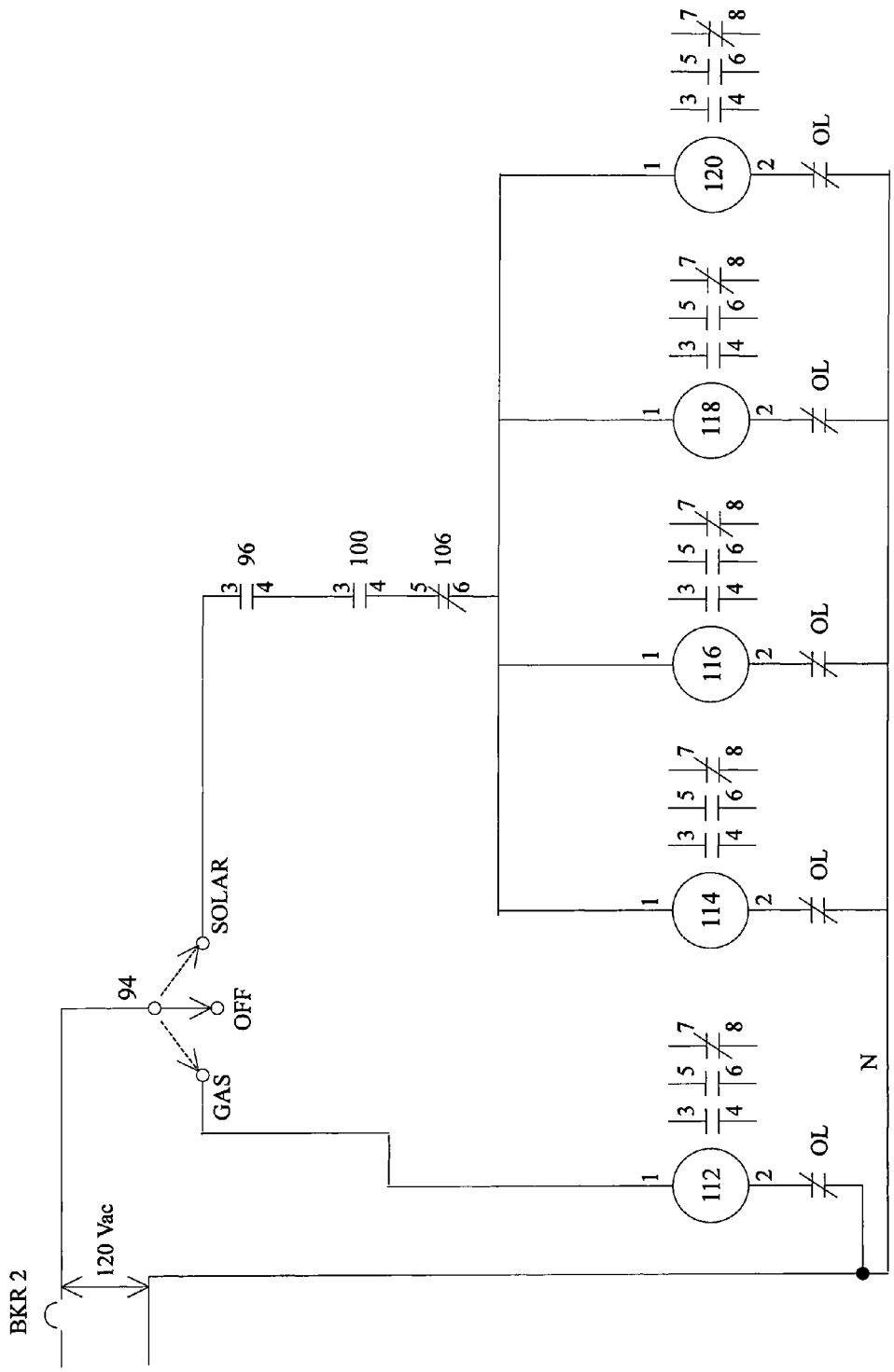

FIG. 13 shows the operation mode selecter switch and auxiliary relay control schematic diagram.

Figure 14:
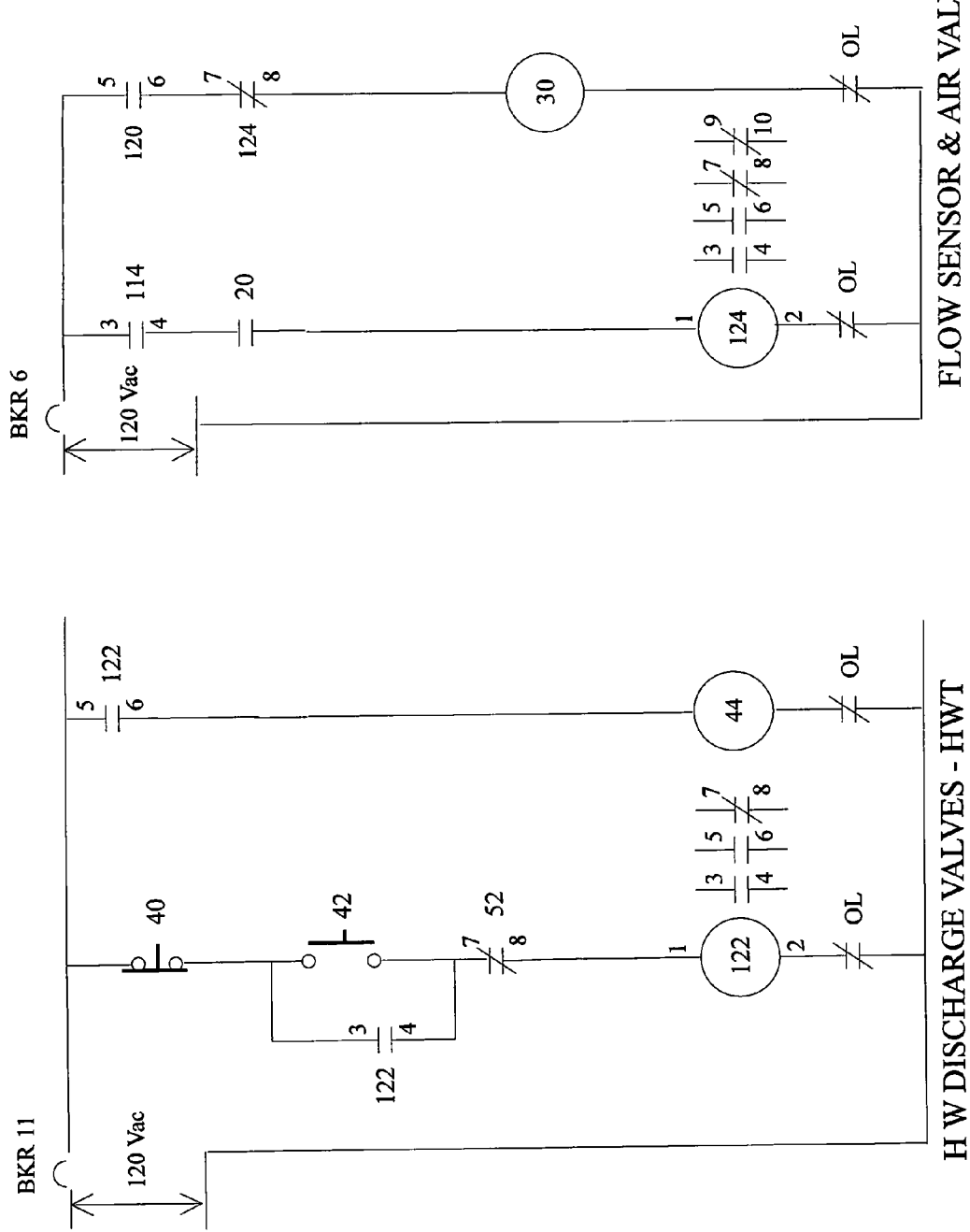

FIG. 14 shows the hot water discharge valve, flow sensor and air valve control schematic diagram.

Figure 15:
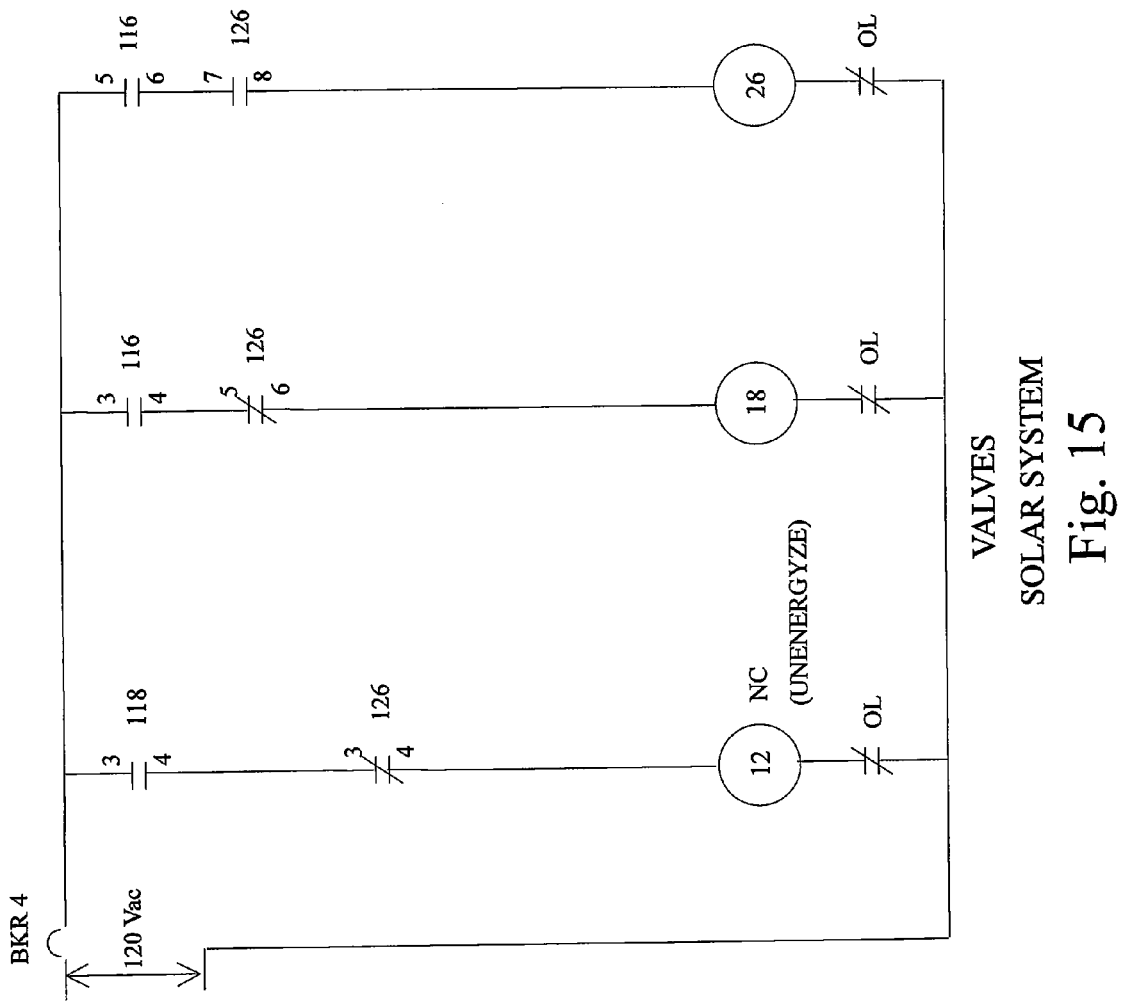

FIG. 15 shows the operation of solar system water valves control schematic diagram.

Figure 16:
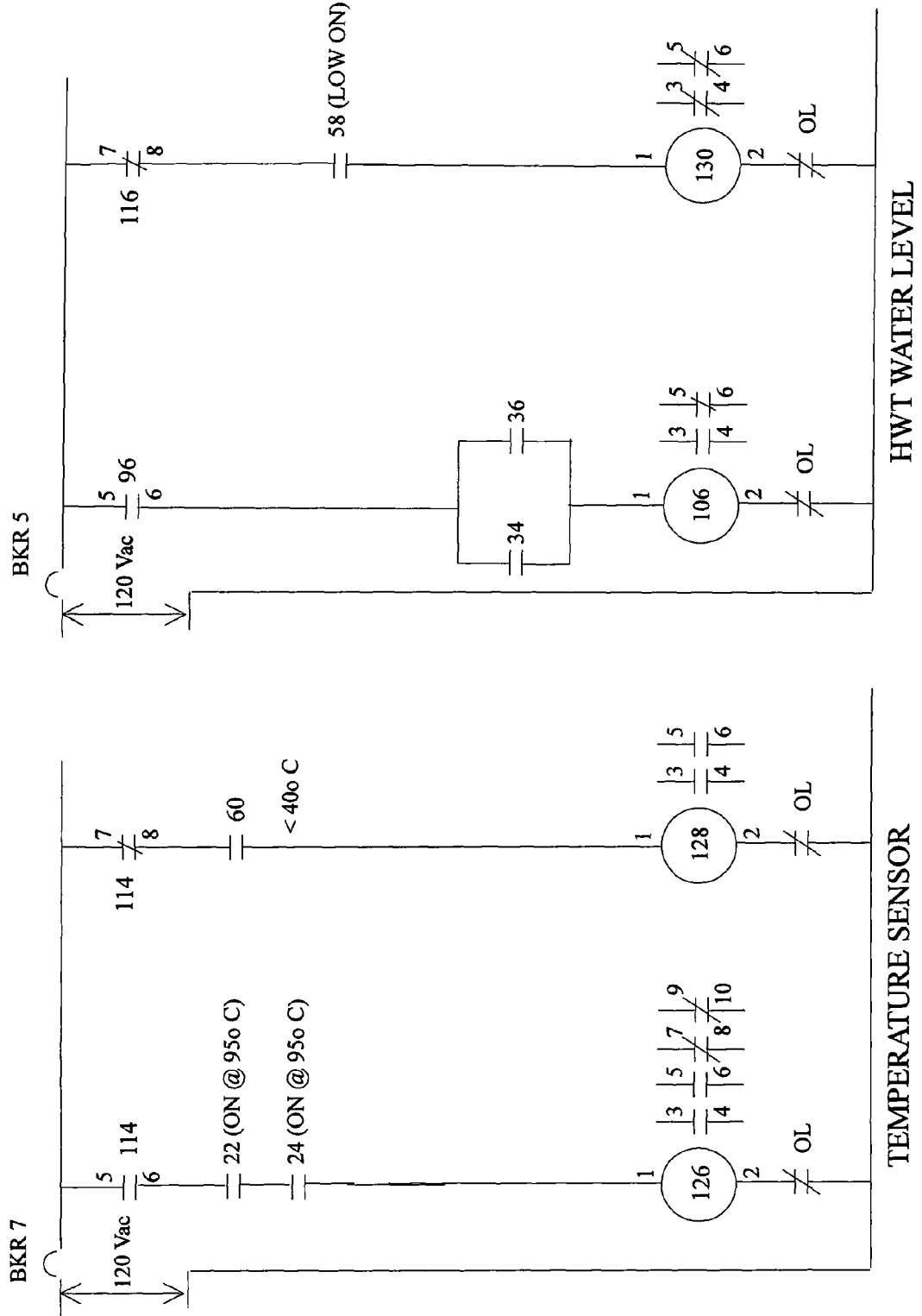

FIG. 16 shows the temperature sensor and the hot water tank water level switch control schematic diagram.

Figure 17:
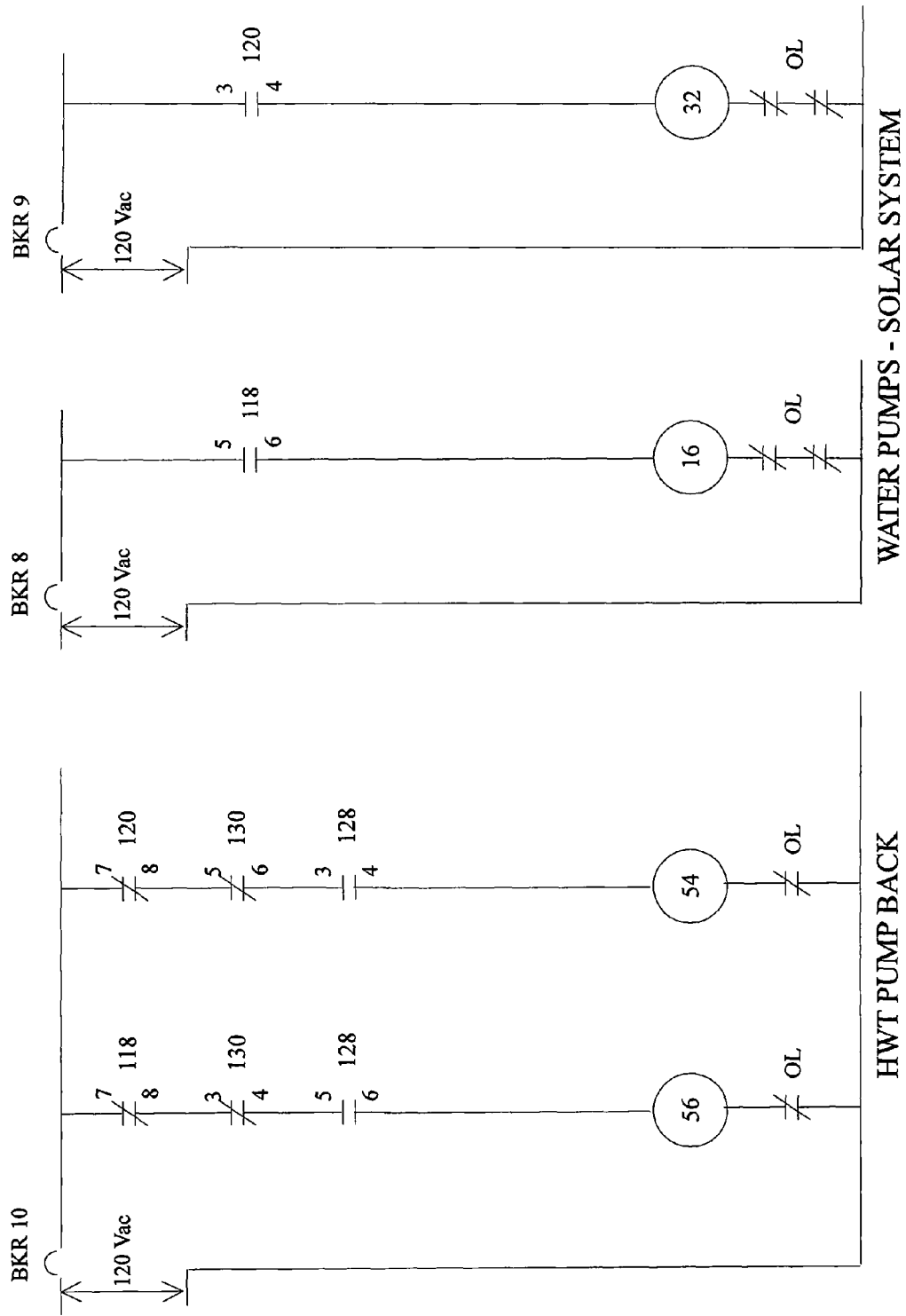

FIG. 17 shows the hot water tank pump back and solar system circulation water pump control schematic diagram.

Figure 18:
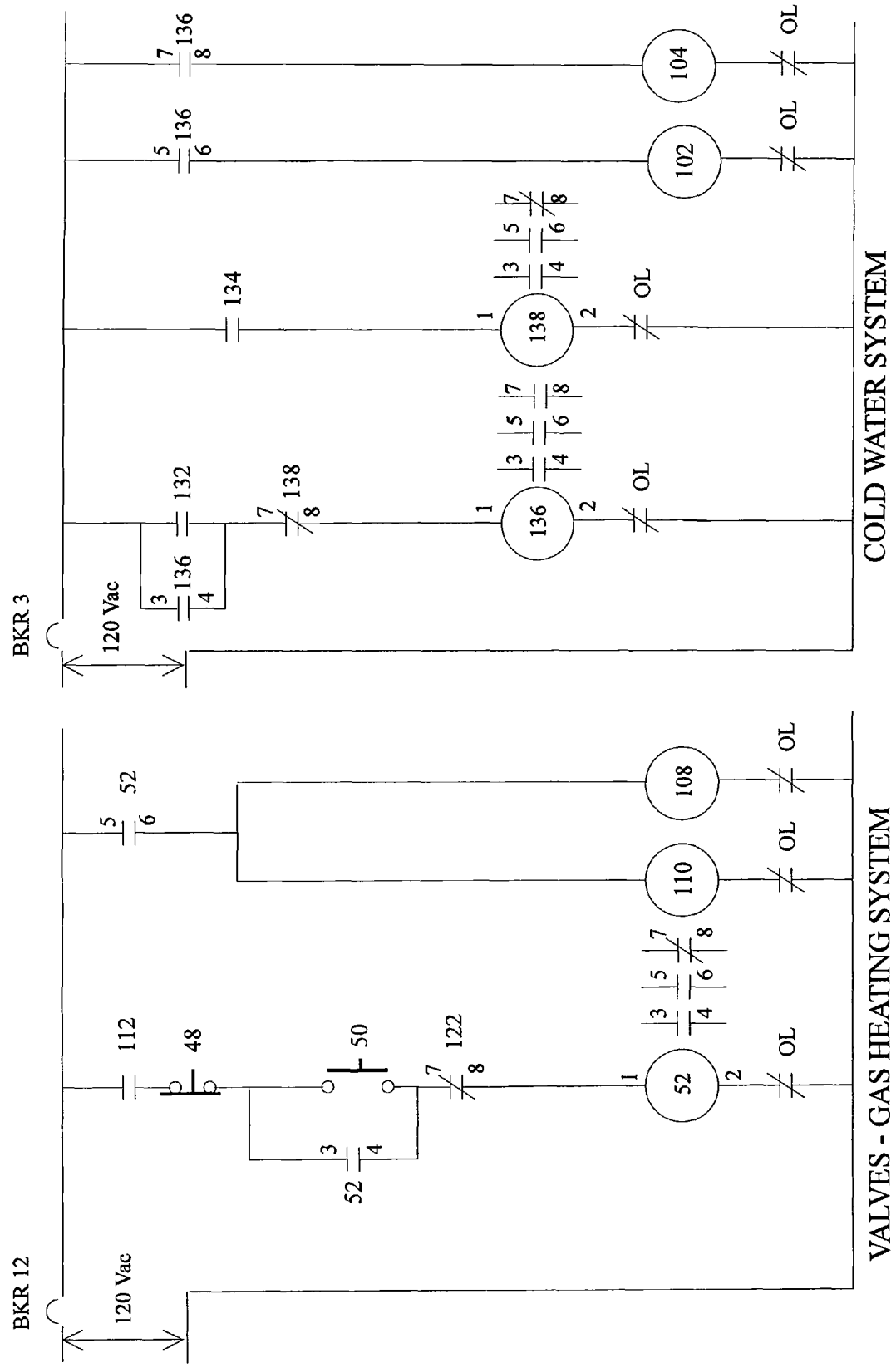

FIG. 18 shows the gas heating system valves and the cold water system pump and valve control schematic diagram.

The last legend sheet lists the system device, instrument and equipment used in the system. The following call out list of elements references the elements of the drawings. The callout list also has the abbreviations of the names of the elements.

10: Cold Water Tank, CWT
12: Water Valve, V1
14: Solar Energy Collector
16: Water Pump, P1
18: Water Valve, V2
20: Water Flow Switch, or sensor, FL1
22: Temperature Sensor, S1
24: Temperature Sensor, S2
26: Water Valve, V3
28: Hot Water Tank, HWT
30: Air Valve, AV1
32: Water Pump, P2
34: Water Level Switch, L1
36: Water Level Switch, L2
38: Level Switch Auxiliary Relay, LX1
40: Push Button, PB1
42: Push Button, PB2
44: Water Discharge Valve, V5
46: Standby Gas Water Heater
48: Push Button, PB3
50: Push Button, PB4
52: Valve Auxiliary Relay, VX2
54: Water Pump, P3
56: Water Valve, V4
58: Water Level Switch, L3
60: Temperature Sensor, S3
62: Aluminum Body of Solar Energy Collector
64: Surface of Solar Energy Collector Aluminum Body
66: Solar Energy Collector Aluminum Body Center Portion
68: Solar Energy Collector Aluminum Body Edge Portion
70: Solar Energy Collector Aluminum Body Bore Hole
72: Solar Energy Collector Glass Window
74: Solar Energy Collector Sealed Vacuum Gap
76: Solar Energy Collector Enclose Frame
78: Solar Energy Collector Insulation
80: Solar Energy Collector Mounting Frame
82: Anchor of Solar Energy Collector Mounting Frame
84: Lightning Arrester of Water Tank
86: Insulation for Hot Water Tank
88: Insulation Pad for Hot Water Tank
90: Grounding Cable for Lightning Arrester
92: Power Distribution Panel
94: Selecter Switch
96: Timer
98: Photo Cell
100: Photo Cell Auxiliary Relay
102: Cold Water Pump, PC
104: Cold Water Incoming Valve, VC
106: Water Level Switch L1 & L2 Auxiliary Relay, LX1
108: Hot Water Discharge Valve, V7
110: Cold Water supply Valve, V6
112: Gas System Auxiliary Relay, RG1
114: Solar System Auxiliary Relay, RS1
116: Solar System Auxiliary Relay, RS2
118: Solar System Auxiliary Relay, RS3
120: Solar System Auxiliary Relay, RS4
122: Water Discharge Valve Auxiliary Relay, VX1
124: Water Flow Switch Auxiliary Relay, FLX
126: Temperature Sensor Auxiliary Relay, SX1
128: Temperature Sensor Auxiliary Relay, SX2
130: Water Low Level Switch Auxiliary Relay, LX2
132: Cold Water Low Level Switch, LCL
134: Cold Water High Level Switch, LCH
136: Cold Water Low Level Switch Auxiliary Relay, CLX
138: Cold Water High Level Switch Auxiliary Relay, CHX
140: One Inch Diameter Water Pipe

DETAILED DESCRIPTION

Persons of ordinary skill in the art will realize that the following description of the present invention is illustrative only and not in any way limiting. Other embodiments of the invention will readily suggest themselves to such skilled persons.

In this design, it includes two major systems. The first one is the solar energy collector system and with water tanks, and the associated piping, pumps and valves. The second is the automatic control system to control the entire system. This includes all device, instrument and equipment in this design, making the control functions mostly automatic. It minimizes the human control actions and human-machine interfaces.

Figure 1:
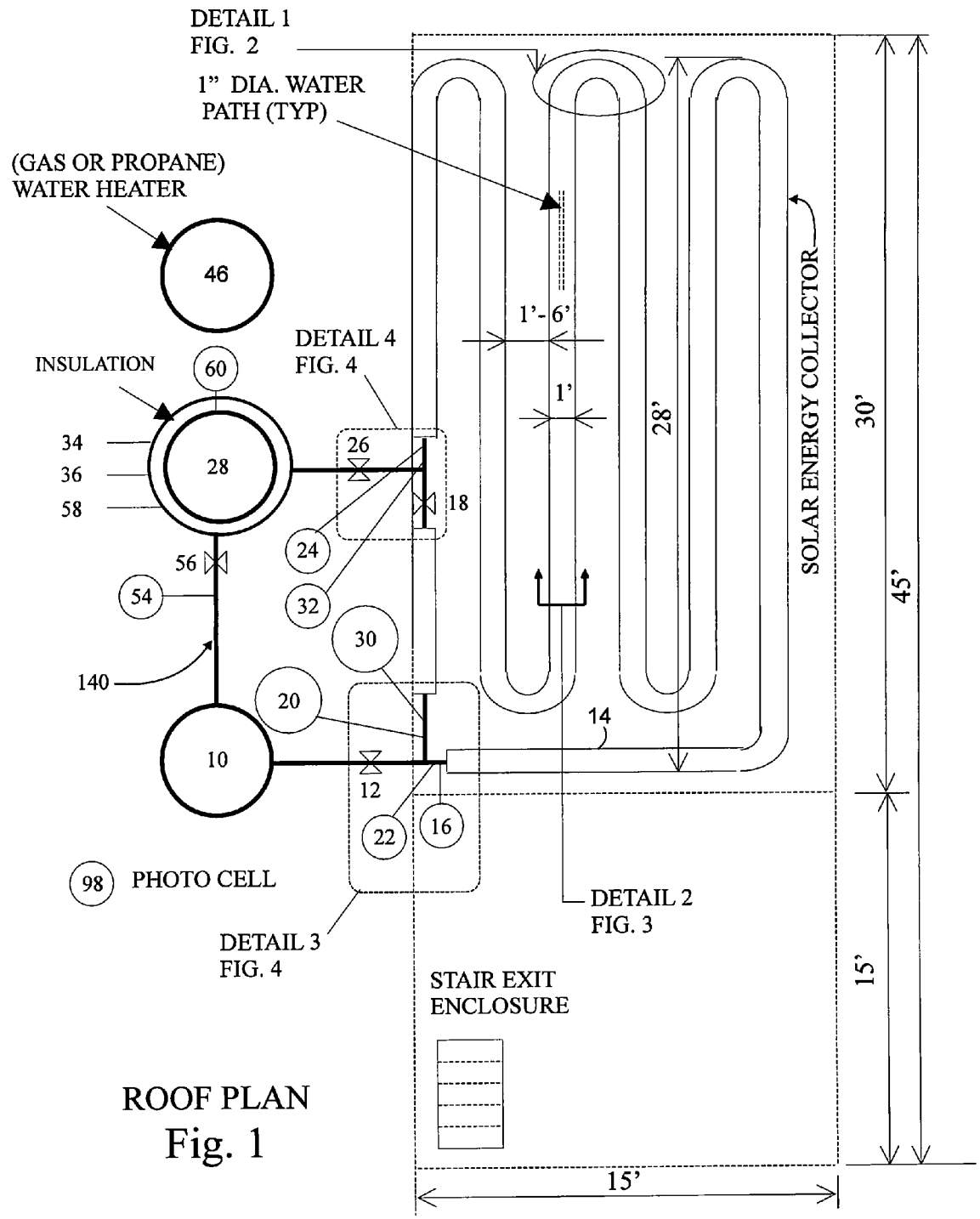

Referring first to the FIG. 1, the cold water source is reserved in the cold water tank 10 (CWT). The cold water to be heated by the solar energy is fed from the CWT 10 through the supply valve 12 (V1) to the water path in the solar energy collector 14. A small water pump 16 (P1) would be used to help the water circulation. The pump 16 will be installed in the pipe section before the pipe is connected to the solar energy collector 14. The water valve 18 (V2) will be open and the water will be circulated in the solar energy collector 14. When the flow switch 20 (FL1) detects the water flow, the water in the solar energy collector 14 is full, the cold water supply valve 12 will be closed (or after a short time delay). From then on the water will be circulated in the closed loop and heated by the solar energy till the water temperature reaches a pre-selected temperature (any temperature selected from 90 to 120 degree C.). Two water temperature sensors 22 (Si) and 24 (S2) are located in the beginning and ending areas of the water path in the solar energy collector 14. When any sensor did not reach the desired pre-set temperature (in this design it is tentatively indicated as 95 degree C.), the water valve 26 (V3) stays closed and the water valve 18 stays open. The water will be going through another circulation and continue to be heated by the solar energy. When both sensors reach the pre-set temperature, the water valve 26 (V3) will be open and the water valve 18 will be closed. The hot heated water will flow to the hot water tank 28 (HWT). The air valve 30 (AV1) which is normally closed during the un-energized state, will be open to supply air in the water path so it won't create vacuum which will make the water flow difficult. A small water pump 32 (P2) is located near the end of path to help pump the tail end hot water. When the flow switch 20 detected that the water flow has finished, after an adjustable time delay, say two minutes, the water valve 12 will be open again, the water valve 18 will be open and the water valve 26 will be closed. A new heating cycle is started again. The heating cycle will be repeated to supply the hot water to HWT 28. In the example shown in the FIG. 1, each cycle can heat about 7 gallons of water in approximately 20 minutes. It will take about three to four hours to complete the process for the day. When the high water level switches 34 (L1) and 36 (L2) in HWT 28 detected the high water level, the level switch auxiliary relay 38 (LX1) will send out a signal to stop the heating process. The hot water is ready to be used as needed. The solar heated hot water discharge from the HWT 28 is initiated by using an ON push button 40 (PB1). The hot water discharge valve 44 (V5) will stay open until an OFF push button 42 (PB2) is pushed.

The HWT 28 is fully insulated to prevent heat escape, able to supply hot water until sunrise next day. In FIG. 1, the area dimensions shown are for illustration only and by no mean limiting.

A standby gas or propane water heater 46 is provided to supply the hot water during the poor weather days (raining or cloudy). A commercial grade standby gas or propane water heater available in market can be used. The discharge and stop discharge of the hot water from this system are also controlled by the push buttons 48 (PB3) and 50 (PB4) and the auxiliary relay 52 (VX2). The auxiliary relay 52 will send signal to open the cold water supply valve 54 (V6) and the hot water discharge valve 56 (V7) of the standby gas water heater. The two sets of push buttons, PB1 & PB2 and PB3 & PB4, one from the solar water heating system and another from the standby gas water heater are interlocked. The piping and valves of the standby gas water heater system are not shown on the FIG. 1 but are shown on the FIG. 9.

At the end of the day when the hot water was consumed, some unused hot water may be left. If the temperature of the remaining hot water drops down to below 40 degree C. (this number is adjustable as needed) the next day, the water is needed to be pumped out from the HWT 28 to the CWT 10 and be reheated. An insulated one inch pipe 140 will be connected between HWT 28 and CWT 10 for the pumping back. The pipe 140 is insulated at the HWT 28 end by a heat insulation coupling to prevent the heat loss at the HWT 28. The water pump 54 (P3), and the water valve 56 (V4) are installed in this piping. An water level switch 58 (L3) installed in and near bottom of the HWT 28 will be used to detect that the pumping out is completed and the pump 54 and the valve 56 will be shut down. The water pumping out is finished. The temperature sensor 60 (S3) is provided to detect the low water temperature in the HWT 28.

It is much easier to install the pump, valve, sensor and the T shape pipe in the pipe section than at the solar energy collector body. The pipe sections shown as Detail 3 and Detail 4 on the FIG. 4 are for the purpose.

Figure 2:
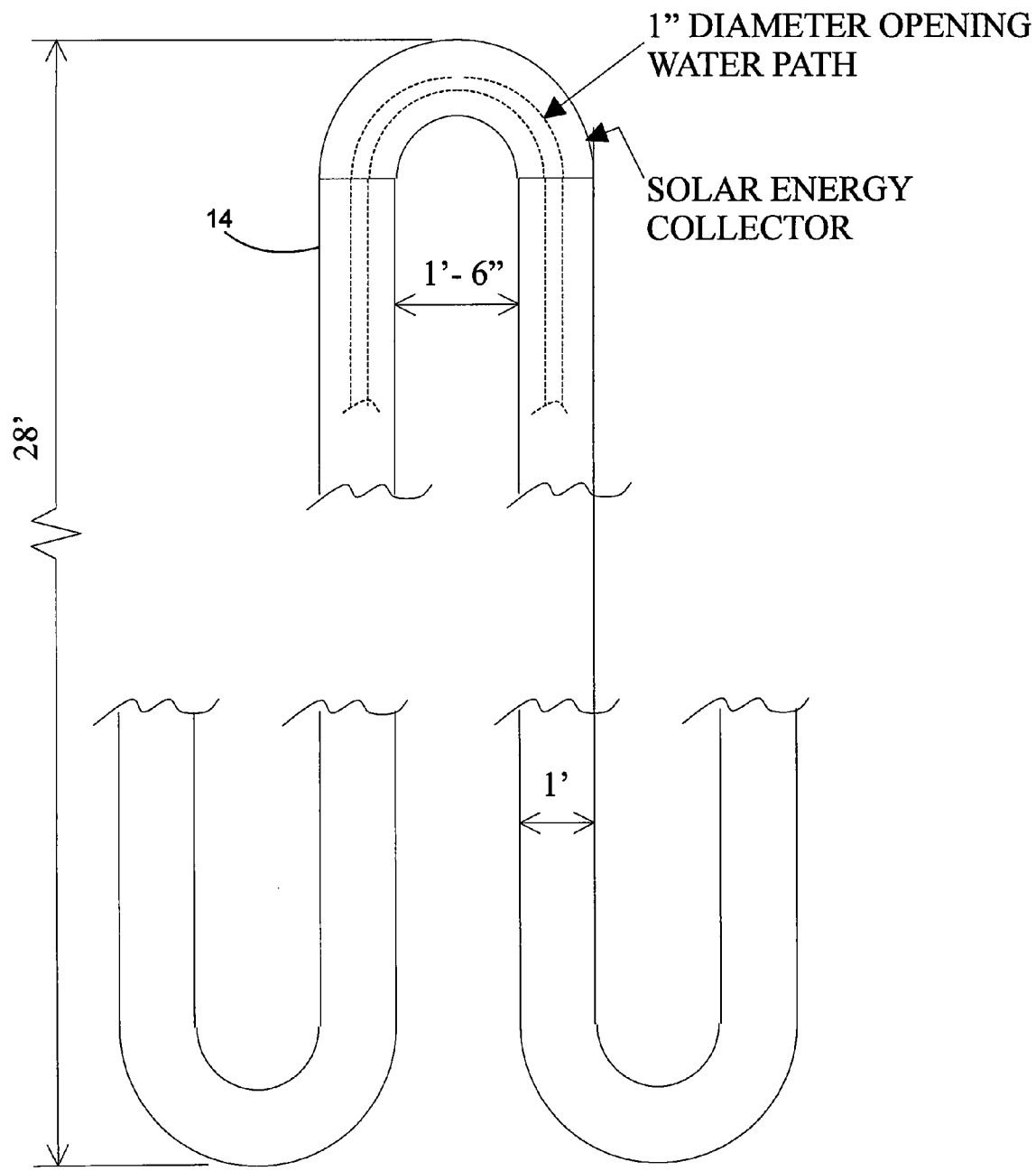
FIG. 2 shows Detail 1, the enlarged solar energy collector arrangement.

The FIG. 2, Detail 1 is the enlarged form of the bending portions of the solar energy collector 14.

Figure 3:
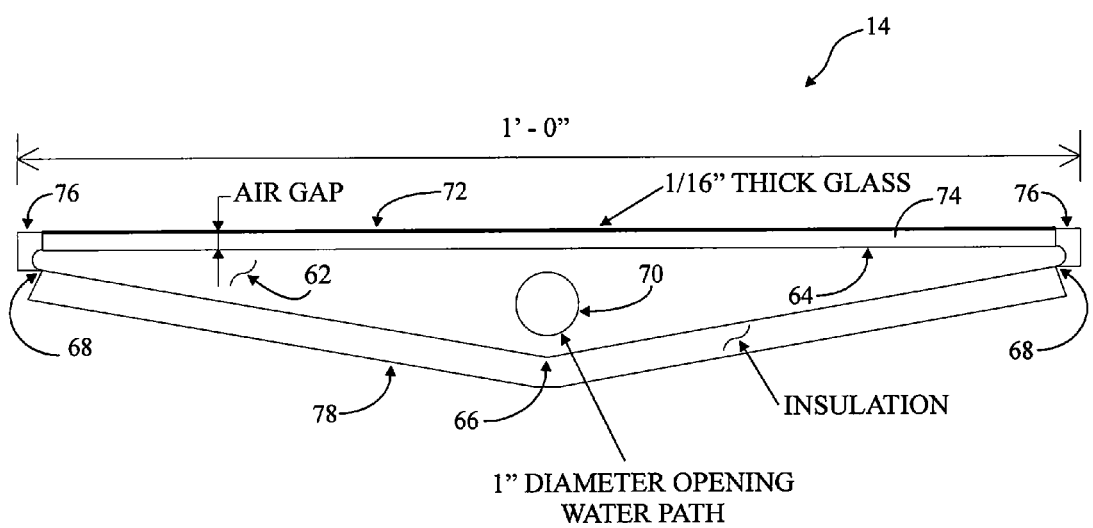
FIG. 3 shows Detail 2, the cross section view of the solar energy collector.

In the FIG. 3, the solar energy collector 14 comprises a solid body 62 having a substantially flat planar solar energy absorbing collecting surface 64. The body 62 is formed from an efficient heat conductive material, yet the cost is low enough to make the system feasible. The planar solar energy absorbing collecting surface 64 should be configured to maximize energy absorption. In some embodiments of the invention, the collecting surface 64 is black in color. The body 62 may be formed from a metal, such as aluminum. The body 62 may be formed using different techniques. One such technique is extrusion, made possible if body 62 is uniform in cross section along its entire length. Persons of ordinary skill in the art will appreciate that other techniques, such as casting, may be employed to form body 62. In embodiments where the body 62 is formed from aluminum, the planar solar energy absorbing collecting surface 64 may be black anodized or may be painted black with non-reflective or low-reflective paint to maximize energy absorption. The black anodized aluminum coating on the aluminum body offers high efficiency solar energy collection. The window 72 may be formed from glass transparent to the majority of solar radiation in the visible spectrum from near ultra-violet to infrared-red, comprising the major portion of the energy in sunlight.

In one exemplary embodiment, the first thickness at the center portion of the body 62 may be about 1.5 to 2 inches, the second thickness at the opposing edges of body 62 may be about 0.25 inch. In one embodiment of the invention, the first thickness tapers to the second thickness substantially linearly. The thicker central portion of the body is to provide higher heat sink and to provide sufficient space for the bore to be completely inside the body. Another effect is to provide sufficient mechanical strength to bear the pressure from high temperature water in the bore. The thin both edges are for the purpose of lower cost by saving quantity of material. Body 62 may be formed in lengths suitable for particular embodiments of a solar generating apparatus. In one embodiment, body 62 may have a width of about 1 foot, and persons of ordinary skill in the art will appreciate that the length selected for any installation will be a function of practical considerations dictated by the particular application. In one embodiment a length of about 5 feet may be used, although persons of ordinary skill in the art will appreciate that considerations such as collector weight, may affect the choice of length.

The solid body has a first thickness at a center portion 66 tapering to a second thickness at each of a pair opposing edge portions 68 defining a width of the body. A bore 70 extends completely through the body along its length and is aligned along an axis at the center portion 66. In use, the bore 70 carries the heat-transfer fluid, water.

A window 72 transparent for most energy carrying solar radiations with wavelengths between UV wavelength and infrared-red wavelengths is disposed at a distance, about ¼ inch, from the collecting surface 64. The window is formed from a material, such as a glass material, that is substantially transparent at most selected solar energy bandwidths. The window 72 is sealed around a periphery of the collecting surface to define a sealed vacuum gap 74 between the collecting surface 64 and up to the bottom surface of the window 72. In one particular embodiment, a window formed from a glass sheet having a thickness of about ¹/₁₆ inch or below shows most effective in passing solar energy bandwidths and trap heat inside the vacuum gap and prevent heat loss back to surrounding atmosphere due to air movement convection around the plate. The glass is a high density material compared to air. A glass with thickness higher than ¹/₁₆ inch would decrease the passing of solar radiation considerably, making it less effective. The window is enclosed in a frame 76. The frame is configured such that it is easily snapped onto the body 62 for replacement. The frame should also be insulated with high grade of insulation material, preferably on or above 92% effective to prevent the heat loss to the surrounding air.

A layer of insulation 78 is disposed below the body 62 on the surface opposite the collecting surface 64 to prevent heat collected in body 62 from being dissipated back into the ambient air. By preserving heat in body 62, the layer of insulation 78 increases the temperature of body 62 and increases the efficiency of heat transfer of the solar energy. The insulation material is high grade, preferably on or above 92% effective to prevent the heat loss to the surrounding air. The thickness of insulation layer 78 will depend on its construction. Persons of ordinary skill in the art will appreciate that the composition of insulation 78 should be selected considering the conditions of the outdoor environment in which solar collector 14 will be employed, including, but not limited to, heat, solar radiation, wind, precipitation, etc. Numerous outdoor-rated insulating materials are available.

It is thought that the solar energy collector body 62 in the form of a black painted aluminum body as disclosed in one embodiment of the invention will absorb 95% of the incoming solar energy. Hence, this is a particularly efficient solar energy harvest system. Aluminum has a high heat conductivity and low cost. It is extremely cost effective and making the system practical.

Figure 5:
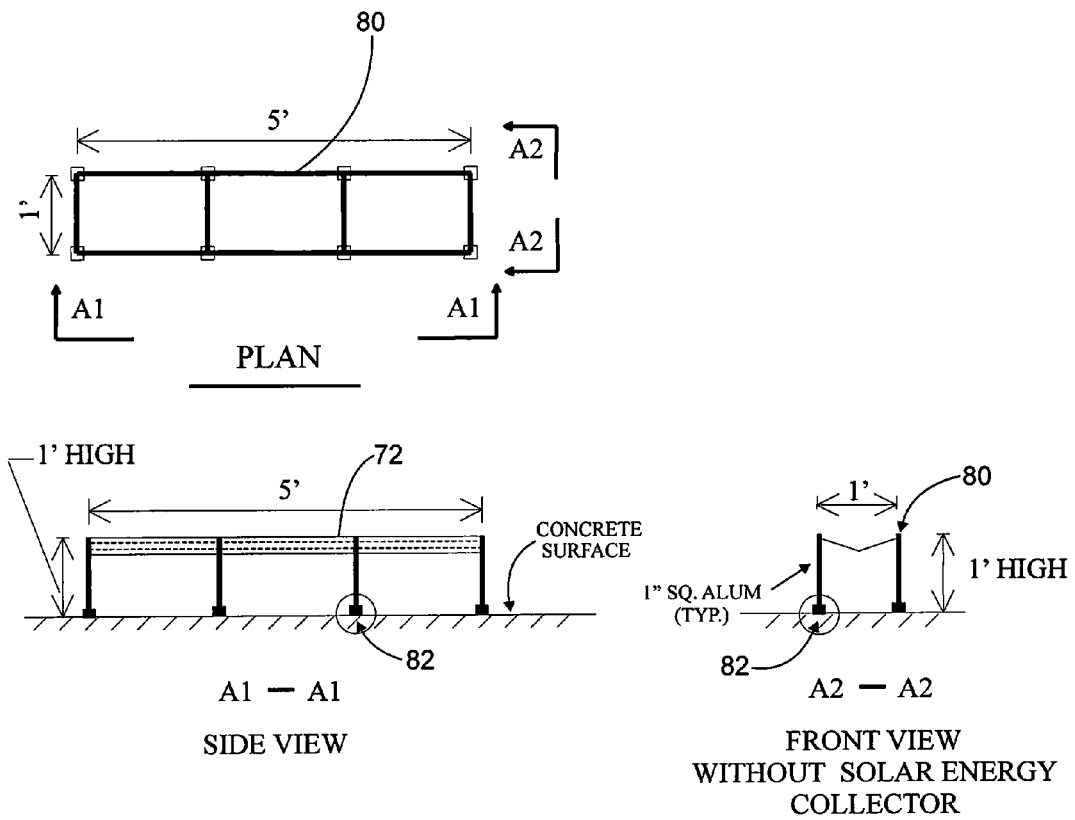
FIG. 5 shows support structure of the solar energy collector.

Referring now to the FIG. 5, a diagram shows one illustrative way of mounting an illustrative solar energy collector in accordance with an aspect of the present invention. Solar energy collector can be mounted on a mounting structure or frame 80 as shown. Persons of ordinary skill in the art will appreciate that support structure 80 may be formed from a suitable material such as a metal, aluminum. Although not necessary, the height of the support structure may be about 1 foot for easier access and ease in performing maintenance work. The support structure 80 should be tied to the supporting concrete below by anchor bolts 82 or some other anchor means.

Figure 6:
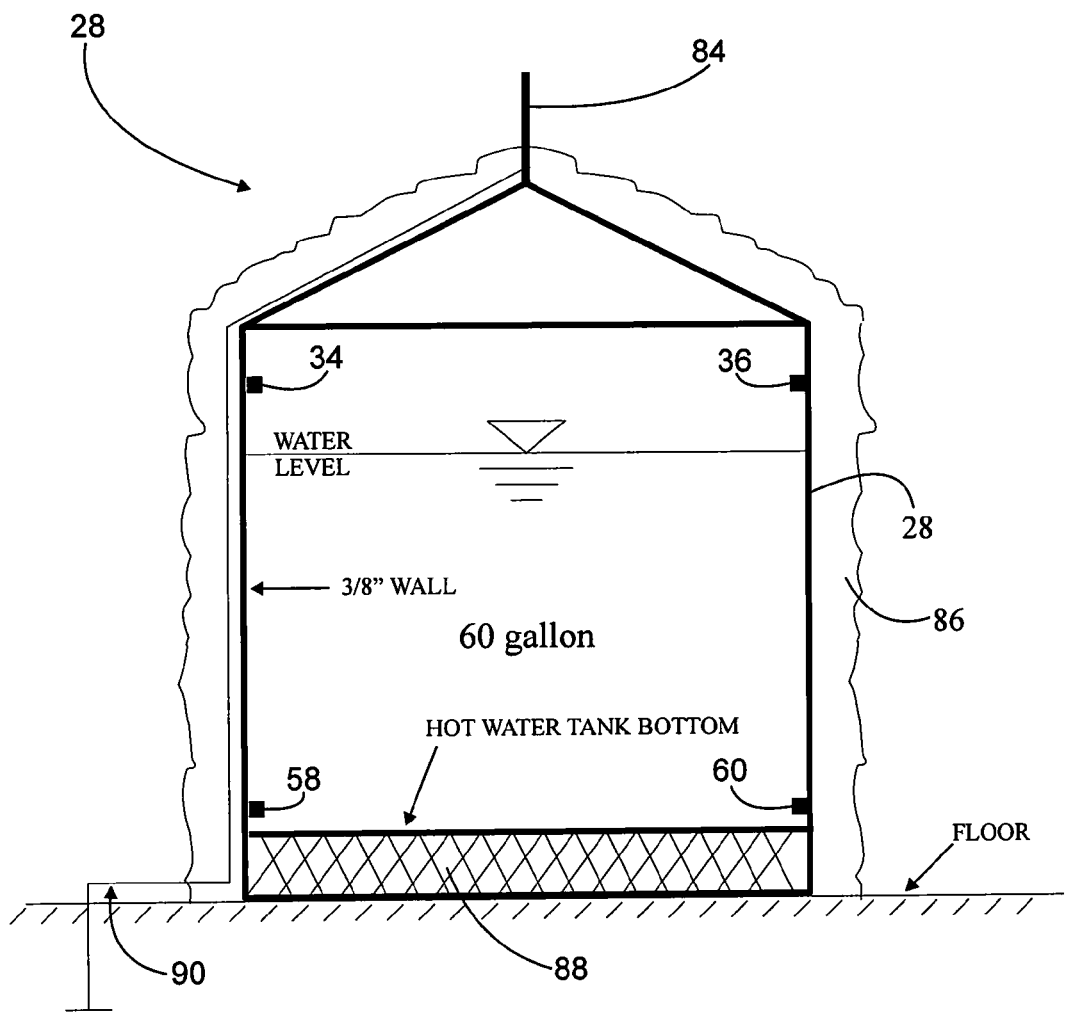
FIG. 6 shows the cross section view of the hot water tank. The inlet and outlet piping are not shown.

Referring to the FIG. 6, persons of ordinary skill in the art will appreciate that a complete heat insulated hot water tank 28 will be able to store the solar heated hot water. The tank capacity is shown as 60 gallons for a typical application, but it is by no mean limited. The tank can be regular metal water tank. It could be stainless steel, galvanized steel or aluminum. When the tank is installed on the top of a tall building, a lightning arrester rod 84 is recommended for protection against lightning. The two high water level switches 34 and 36 will be used to detect when the water level is near full. When the two high water level switches 34 and 36 detect the high water level, the system control devices will be actuated to stop the solar heating process. The temperature sensor 60 (S3) is used to detect the temperature of leftover hot water. It will be used to initiate the pump-out of remaining water to be reheated. The actuation of low level switch 58 (L3) will indicate that the pump-out is sufficient and it will be used to stop the pump-out. The insulation 86 will be used to insulate on the side and the top area of the hot water tank 28 to prevent the heat lost. The heat insulation pad 88 will be installed under the hot water tank 28 to prevent the heat loss from the bottom of the tank. A grounding system 90 will be used to connect the lightning arrester 84 to the ground for discharging the electric charges when the lightning hits.

Figure 7:
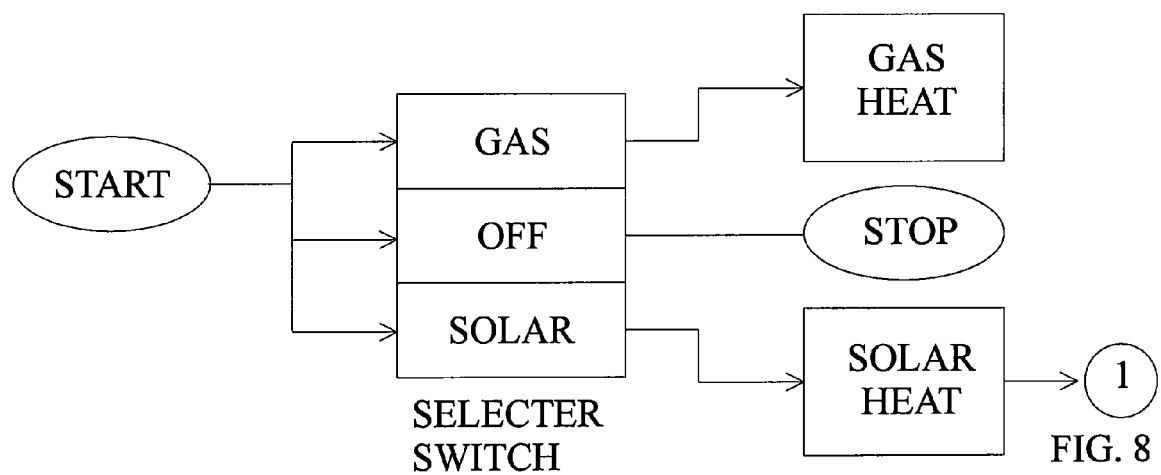
FIG. 7 shows the system selector logic diagram.
Figure 8:
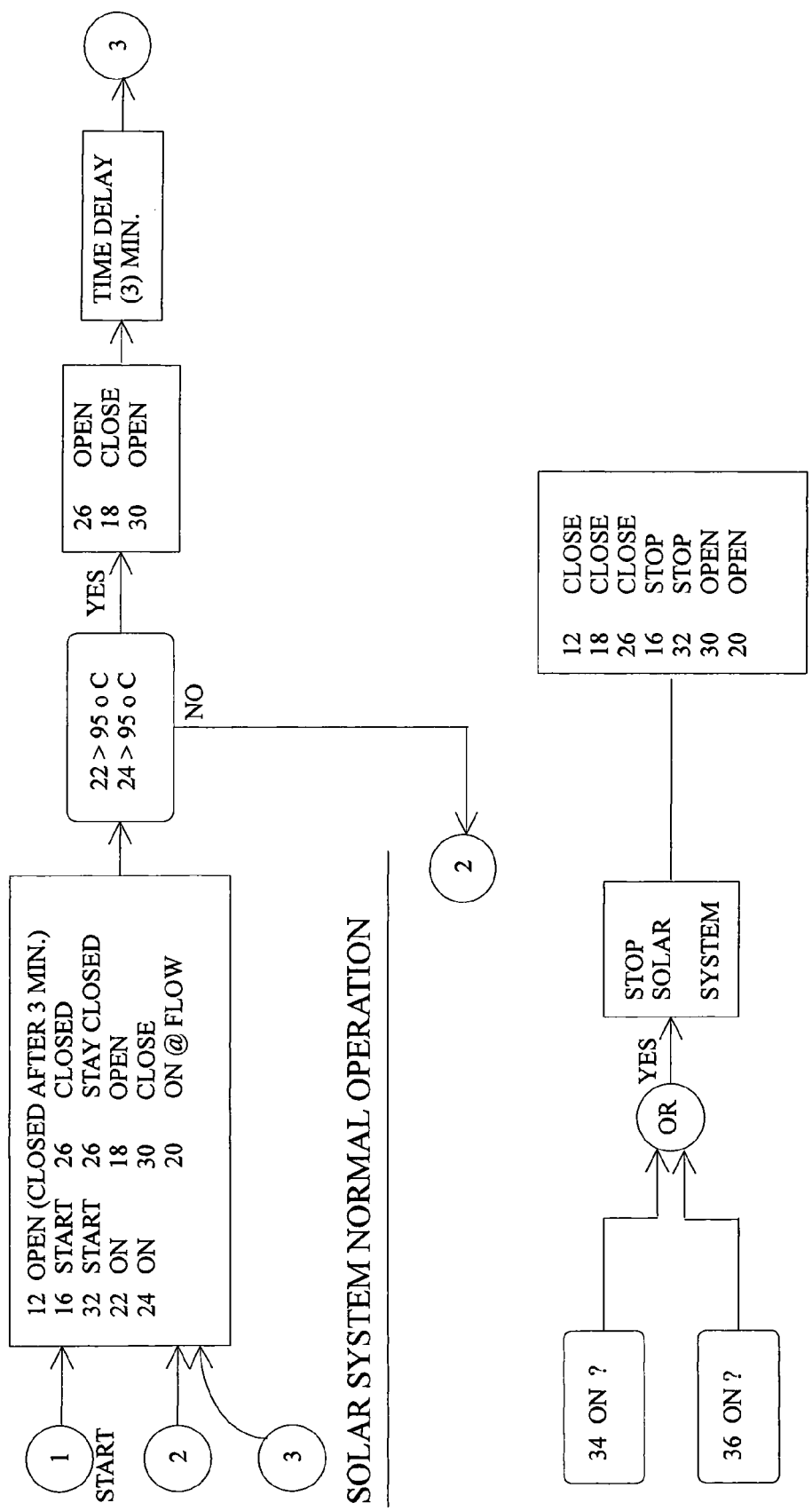
FIG. 8 shows the system operation logic diagram.

Persons of ordinary skill in the art will appreciate that the capability of automatic control of the whole operation would be desirable. The operation with minimum human-machine interface is the purpose of this design. The automatic control system will include a three phase 208/120 Volt power distribution panel 92 to supply small power to all control devices, instrument and equipment. The power distribution circuit arrangement is shown in the FIG. 11. In order to follow the weather changes and to suit the weather condition at the time, the capability for the system to select between operation modes such as solar heating, gas heating or off mode is needed and an operating logic is shown in FIG. 7. The selecter switch 94 is shown in the FIG. 10B. The solar heating operation control logic is shown in the FIG. 8.

A few permissive conditions are required for the solar heating process to take place. It shall be a sunshine day, it shall be at the day time, for instance 8 AM to 6 PM when a sufficient sunshine is available, and the hot water tank shall not be full. The sunny day is detected by the photo cell 98 (FIG. 12) and supplemented by an auxiliary relay 100. The auxiliary relay 100 is required for the interfaces with other circuit devices. The day time signal is initiated by a timer 96 (FIGS. 10A & 12). The hot water tank high water level is detected by two level switches 34 & 36 (L1 & L2, FIG. 16) and supplemented by an auxiliary relay 106. The auxiliary relay 106 is required for the interfaces with other circuit devices. Two level switches 34 & 36 are used as redundant to each other to secure a reliable operation.

Figure 9:
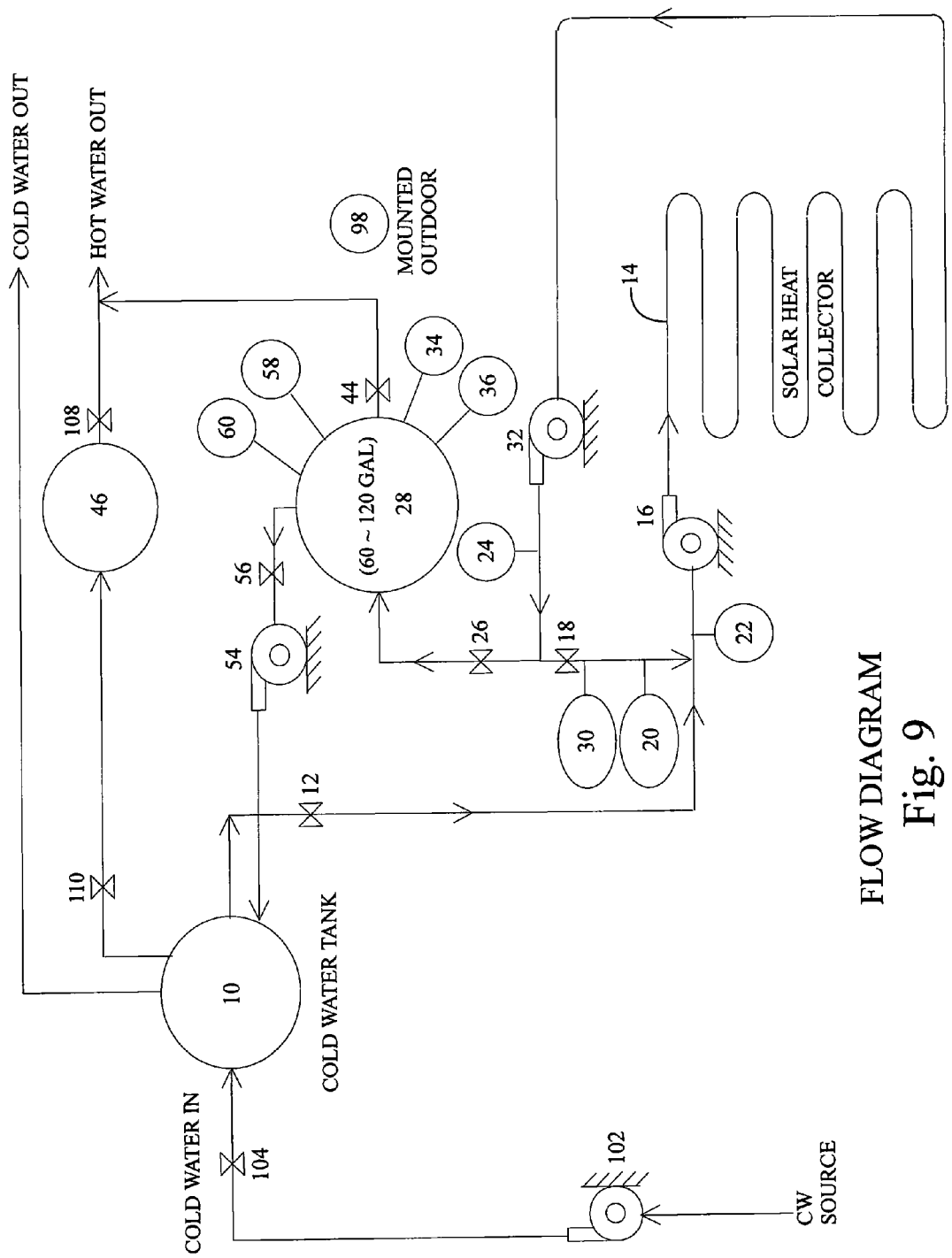
FIG. 9 shows the system flow diagram.

Refer to the FIG. 9, the flow diagram shows the water flow corresponds to system shown on the FIG. 1. Persons of ordinary skill in the art will appreciate that the cold water will be pumped in from the cold water source through pump 102 (PC) and valve 104 (VC) to the cold water tank 10 (CWT). When the permissive conditions to operate with solar heating are satisfied, the cold water will enter the solar heat collector system 14 to receive the solar heat, raising the water temperature. When the temperature sensors 22 (S1) & 24 (S2) detected the water temperature to be on or above the preselected temperature (for example, 95 degree), the valve 26 (V3) will be open and the valve 18 (V2) will be closed. The hot water will flow into the hot water tank. The hot water discharge valves 44 (V5) and 108 (V7) are controlled by the push buttons. The valve 110 (V6) is controlled at the same time and together as the valve 108 (V7).

The FIG. 12 shows the control schematic diagram of the timer 96 and the photo cell 98 with an auxiliary relay 100 (PHX). The timer 96 and the auxiliary relay 100 provide auxiliary contacts for other control circuits.

The FIG. 13 shows the control schematic diagram of the selecter switch 94 and the auxiliary relays 112 (RG1), 114 (RS1), 116 (RS2), 118 (RS3) and 120 (RS4). The auxiliary relays provide control circuit contacts for other control circuits.

The FIG. 14 shows the control schematic diagrams of the hot water discharge valve 44 (V5), the flow switch 20 (FL1) and the air valve 30 (AV1). The auxiliary relays 122 (VX1)

and 124 (FLX) are used to provide contacts for other control circuits. The push button 40 (PB1) is used to break the circuit of 122 (VX1), shutting off the hot water discharge from the valve 44 (V5). The push button 42 (PB2) is used to initiate operation of the auxiliary relay 122 (VX1) to open the valve 44 (V5) and initiate the hot water discharge from the hot water tank 28. The auxiliary relay 122 (VX1) is interlocked with the auxiliary relay 52 (VX2, FIG. 18), to prevent the simultaneous hot water discharge from the solar heating system and the gas heating system. The auxiliary relay 124 (FLX) is actuated by the flow switch 20 (FL1). The contact of the flow switch 20 (FL1) will be closed when the water flow begins and it will be open when the water flow stops. The air valve 30 (AV1) will be open only when the auxiliary relay 124 (FLX) is not energized, that is when there is no water flow at the flow switch 20 (FL1).

The FIG. 15 shows the control schematic diagram of the solar heating system water valves 12, 18, and 26 (V1, V2 and V3). Each branch shows the valve to be energized under certain conditions. The valves are normally de-energized and in the closed positions. Each valve will be energized and open when all the contacts in that individual circuit are closed.

Refer to the FIG. 16, the diagram shows the control schematics of the temperature sensors and the HWT water level switches with auxiliary relays. The auxiliary relays provide contacts to other control circuits. The temperature sensors 22 and 24 (S1 and S2) will pick up at a predetermined temperature in the water flow (for example at 95° centigrade). The sensor auxiliary relay 126 (SX1) will then be energized. The temperature sensor 52 (S3) will pick up at a predetermined temperature in the hot water tank (for example at 40° centigrade) when the water temperature is descending. The sensor auxiliary-relay 128 (SX2) will then be energized. The level switches 34 and 36 (L1 and L2) will pick up at a predetermined high water level in the hot water tank. The level switch auxiliary relay 106 (LX1) will then be energized. At this time, the hot water tank is about full and the solar water heating process will be stopped. The level switch 58 (L3) will pick up at a predetermined low water level in the hot water tank. The level switch auxiliary relay 130 (LX2) will then be energized.

The FIG. 17 shows the control schematic diagrams of the HWT pump back valve 56 and pump 54 (V4 & P3) of the remaining low temperature warm water, and the solar system water pumps 16 and 32 (P1 & P2). When the temperature of the remaining water in the hot water tank 28 is lower than a predetermined value, say 40° C., the water needs to be pumped back to the cold water tank 10 and be reheated again. The temperature sensor auxiliary relay 128 (SX2) will be energized and it will initiate the process of starting the pump 54 (P3), also open the water valve 56 (V4). On the other schematic diagram, the water pumps 16 and 32 (P1 and P2) will be started and remaining in operation during the solar heating process is on.

The FIG. 18 shows the control schematic diagram of the gas heating system valves 110 & 108 (V6 & V7) and the auxiliary relay 52 (VX2), and cold water system pump 102 (PC) and valve 104 (VC). The pump 102 (PC) and the valve 104 (VC) are actuated by the low water level switch 132 (LCL) installed in the cold water tank 10 and its auxiliary relay 136 (CLX), and stop operation when the high water level switch 134 (LCH) in the CWT 10 is actuated and energizing the auxiliary relay 138 (CHX). When the sunshine is not available due to the weather conditions, a gas water heating system will be actuated to supply the hot water. Pushing the push button 50 (PB4) will initiate the process. The auxiliary relay 50 (VX2) is energized and it will actuate the open process for the valves 110 and 108 (V6 and V7) completing the hot water discharge path in open position. For the cold water tank 10 (CWT), the source cold water is pumped in by the cold water pump 102 (PC). When the water level in the cold water tank 10 is low, the level switch 132 (LCL) will pick up and energize the auxiliary relay 136 (CLX). The auxiliary relay 136 (CLX) will initiate the starting of the cold water pump 102 (PC) and will open the incoming water valve 104 (VC). When the water level in the cold water tank 10 reaches the high limit level, the high water level switch 134 (LCH) will be closed and actuate the high water level auxiliary relay 138 (CHX). The auxiliary relay 138 (CHX) will de-energize the auxiliary relay 136 (CLX) and dropping the pump 102 (PC) and the valve 104 (VC). The pumping will stop.

The LEGEND sheet lists the devices, instruments and equipment used in this invention to help identify each items.

A small control panel can be used to house the auxiliary relays, push buttons, and other control devices, instrument and equipment.

The control schematic diagrams shown are used to describe the invention ideas. Those ideas could be reworked with a computer program and packed in a small computer.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims. For example, the solar energy collector body is sealed at three surfaces with high efficiency insulation material except at the top of glass window. The insulation material has an insulation efficiency of 92 percent minimum. An automatic water flow control system is included in this design, to minimize the human-machine interfaces and reduce the human error, and make it easy for human on operation. Piping is used intermittent between segments of the solar energy collector body for ease of installing pumps, valves and sensors. A cold water storage tank, hot water tank and a standby gas or propane water heating subsystem will be included for a complete and reliable hot water system.

The invention claimed is:
1. A solar water heating system comprising:
 a. a solar energy collector configured to absorb solar energy to heat cold water to make hot water for building use, wherein the solar energy collector has a solid body having a length, wherein the solar energy collector has a flat planar solar energy absorbing collecting surface, wherein the solid body has a first thickness at a center portion tapering to a second thickness at each of a pair opposing edge portions defining a width of the body, wherein the second thickness is less than the first thickness, wherein the flat planar solar energy absorbing collecting surface is black in color either by painting or by anodized aluminum coating;
 b. a bore extending completely through the body inside the body, wherein the bore extends along the length and wherein the bore is aligned along an axis at the center portion;
 c. a glass window having at least partial transparency at solar energy wavelengths, wherein the glass window is disposed at a distance from the flat planar solar energy absorbing collecting surface, wherein the glass window is sealed around a periphery of the flat planar solar energy absorbing collecting surface to define a sealed space gap between the collecting surface and the bottom surface of the window, wherein the sealed space gap is filled with a gas to resist atmosphere pressure, wherein the window resists mass heat dissipation from the body to the atmosphere; and d. a water flow handler and an automatic control system including, an automatic water flow control system to control a process of heating cold water to hot water wherein the automatic control system further includes a power distribution panel, a control panel, a timer, a photo cell, a temperature sensor, a flow sensor, a selector switch, a push button, an auxiliary relay, an air valve, a water valve, a level switch, a pump and piping.

2. The solar water heating system of claim 1, wherein the sealed space gap is filled with nitrogen gas to resist atmosphere pressure.

3. The solar water heating system of claim 1, wherein the solar energy collector body is formed as an extrusion or casting.

4. The solar water heating system of claim 1, wherein the solar energy collector body is formed from a metal aluminum.

5. The solar water heating system of claim 1, wherein the window is formed from glass transparent for UV wavelengths.

6. The solar water heating system of claim 1, wherein the thickness of the window glass is a maximum of $1/16^{th}$ of an inch, but can be thinner to maximize the passage of sunlight.

7. The solar water heating system of claim 1, wherein the first thickness at the center portion is between about 1.5 inches and 2 inches.

8. The solar water heating system of claim 1, wherein the second thickness at the opposing edges is equal to or less than 0.25 inches.

9. The solar water heating system of claim 1, wherein the first thickness tapers to the second thickness linearly.

10. The solar water heating system of claim 1, wherein the space gap between the glass and the bottom heat collector aluminum plate is filled with air or nitrogen and the space gap is equal to or less than 0.25 inches.

* * * * *